United States Patent
Rohit et al.

(10) Patent No.: US 9,807,734 B2
(45) Date of Patent: *Oct. 31, 2017

(54) INTERSECTION SIGNALING METHOD FOR BEARER MANAGEMENT

(71) Applicant: Tejas Networks Limited, Bangalore (IN)

(72) Inventors: Kumar Rohit, Bangalore (IN); R C Sanil, Bangalore (IN); Kumar M Vinod, Bangalore (IN)

(73) Assignee: TEJAS NETWORKS LTD., Bangalore, Karnataka (IN)

( * ) Notice: Subject to any disclaimer, the term of this patent is extended or adjusted under 35 U.S.C. 154(b) by 0 days.

This patent is subject to a terminal disclaimer.

(21) Appl. No.: 13/853,737

(22) Filed: Mar. 29, 2013

(65) Prior Publication Data

US 2013/0258941 A1 Oct. 3, 2013

(30) Foreign Application Priority Data

Mar. 30, 2012 (IN) .......................... 1252/CHE/2012

(51) Int. Cl.
*H04W 4/00* (2009.01)
*H04W 72/04* (2009.01)
(Continued)

(52) U.S. Cl.
CPC ......... *H04W 72/04* (2013.01); *H04W 76/022* (2013.01); *H04W 72/00* (2013.01); *H04W 84/047* (2013.01); *H04W 88/16* (2013.01)

(58) Field of Classification Search
CPC ... H04W 72/04; H04W 72/00; H04W 84/047; H04W 88/16; H04W 76/022
See application file for complete search history.

(56) References Cited

U.S. PATENT DOCUMENTS

2011/0044249 A1* 2/2011 Wu et al. ...................... 370/328
2011/0080891 A1* 4/2011 Cai et al. ...................... 370/331
(Continued)

OTHER PUBLICATIONS

3GPP Organizational Partners, 3GPP TR 36.806 V9.0.0, "Technical Specification Group Radio Access Network; Evolved Universal Terrestrial Radio Access (E-UTRA); Relay architectures for E-UTRA (LTE-Advanced)". Mar. 2010, pp. 1-34, Release 9, 3GPP Organizational Partners, Valbonne, France.

*Primary Examiner* — Clemence Han
(74) *Attorney, Agent, or Firm* — Prakash Nama; Global IP Services, PLLC (57) ABSTRACT

Intersection signaling method for bearer management in a communication network with transporting bearer resource request message of both the UE and RN via Base station to managing entity of RN within EPC, as a signaling message over uplink channel referred to as 'Union of Resource Request (UR Request)' message. The bearer resource response message from one of the managing entity of UE or managing entities of UE and RN within EPC are transported as a signaling message to Evolved Packet Edge (EPE) via Base station over the downlink channel referred to as 'Intersection of Admission Response (IA Response)'. This manages bearer setup signaling as a single loop, by transportation of 'UR Request' signaling message and receiving one "IA Response" signaling message over uplink and downlink channels respectively. EPE is a conglomeration of network nodes.

15 Claims, 5 Drawing Sheets

(51) Int. Cl.
    *H04W 76/02*     (2009.01)
    *H04W 72/00*     (2009.01)
    *H04W 84/04*     (2009.01)
    *H04W 88/16*     (2009.01)

(56) References Cited

U.S. PATENT DOCUMENTS

| | | | |
|---|---|---|---|
| 2011/0128908 A1* | 6/2011 | Lee et al. | 370/328 |
| 2012/0114021 A1* | 5/2012 | Chung et al. | 375/211 |
| 2013/0195015 A1* | 8/2013 | Takahashi et al. | 370/328 |
| 2013/0203381 A1* | 8/2013 | Takahashi et al. | 455/410 |
| 2014/0003329 A1* | 1/2014 | Chen | 370/315 |

* cited by examiner

Figure 1

PRIOR ART

INTERSECTION SIGNALING METHOD FOR BEARER MANAGEMENT

FIELD OF THE INVENTION

The present disclosure relates to bearer management in a wireless communication network. In particular, the invention relates to transport of signaling messages on the interface between a relay node and another node in a mobile communication network.

BACKGROUND

In order to provide better qualities of service and wider communication ranges between wireless nodes, the concept of relay station has been introduced in network systems. The purpose of deploying relay station or Relay Node (RN) in network system is to extend the serving coverage of base station; hence, user equipment (UE) which is not within the communication coverage of base station can access the services provided by relay node as well via base station.

Wireless network architecture as defined by 3GPP introduces wireless relay node (RN) entity to extend the coverage of base station (evolved Node B or eNodeB or eNB). A long term evolution-advanced (LTE-A) system, as its name implies, is an evolution of the LTE system, considering relaying for cost-effective throughput enhancement and coverage extension. For example, a relay can be deployed at the cell edge where the eNB is unable to provide required radio quality/throughput for the UEs or at certain location where radio signals of the eNB cannot cover.

The Relay Node (RN) forms an independent physical cell. From a user equipment (UE) perspective, the RN is seen as a usual base station. The RN is connected via a wireless link to the base station. The relay node architecture deployment foresees that a RN emulates a base station for the UE, which means that the UE would see the RN as a usual base station. From the network side, the RN is seen as a usual UE by the base station. The base station or eNB, to which the RN is connected, is called Donor-eNB (DeNB) hereinafter referred to as Base station or eNB and operates as a usual base station. The deployment of RN in the 3GPP network architecture is described in 3GPP Technical Specification 36.806; "Relay architectures for E-UTRA (LTE-Advanced)".

In order for the user equipment to receive a service from the network, it needs to establish connectivity via base station, by initiating Non-Access Stratum (NAS) signaling messages with network nodes like Mobility Management Entity (MME) serving the UE. Consequential signaling messages are exchanged between network nodes to allocate bearer resources for UE and RN to service the UE request. The above bearer management procedure can be initiated by UE or the Evolved Packet Core (EPC in terms of 3GPP LTE) or simply the communication network. Similar procedures are followed for managing existing bearers. The managing functions include creating new entry, updating and deleting.

Thus, whenever a UE bearer is created or modified, the RN bearer modify or create procedures may be initiated by the RN. This increases the exchange of messages separately for the UE and for the RN to modify/create a new bearer. Thus additional messages may be exchanged by the RN each time a bearer is created/modified for the UE, leading to delayed access service and as well as backhaul bandwidth is wasted or underutilized. Therefore, there is a need for a bearer management to optimize radio and backhaul resources by effectively setting-up the bearers.

SUMMARY OF THE INVENTION

The summary represents the simplified condensed version of the claimed subject matter and it is not an extensive disclosure of the claimed subject matter. The summary neither identifies key or critical elements nor delineates the scope of the claimed subject matter. The summary presents the simplified form of the claimed subject matter and acts as a prelude to the detailed description that is given below.

The present invention and its embodiments are made to provide for a feasible solution for facilitating bearer management in a communication network optimizing exchange of signaling communication in managing bearers for UE and RN.

An aspect of the invention provides for a method of managing bearer signaling in a communication network, by transporting "Union of Resource Request" (UR Request) signaling message from Evolved Packet Edge (EPE) entities to managing entities of RN via Base station and receiving "Intersection of Admission Response" (IA Response) signaling message for the transported UR Request from management entity of UE by Base station wherein the said management entity serves/manages all the entities in the EPE. EPE is a conglomeration of network nodes comprising of user equipment, relay nodes and all other network nodes that communicate with EPC via Base station Network nodes in the EPE may establish connectivity external to EPC like Internet or PSTN (Public Switch Telephone Network).

Another aspect relates to receiving "Intersection of Admission Response" (IA Response) signaling message for the transported UR Request from management entity of UE by the Base station wherein at least one of the said management entities are not serving/managing the same entities in the EPE.

Another aspect relates to network nodes like RN, Base station MME_RN and MME_UE and systems facilitating the above method of managing bearers each comprising of at least a receiver, for receiving the said messages, processors for executing the functions, transmitter for transmitting messages, a memory for storing information and retaining instructions for executing functions associated with the above methods.

Other aspects, advantages, and salient features of the invention will become apparent to those skilled in the art from the following detailed description, which, taken in conjunction with the annexed drawings, discloses exemplary embodiments of the invention.

DESCRIPTION OF THE DRAWINGS

The features, advantages and other aspects of the embodiments of the present invention will be obvious to any person skilled in the art to appreciate the invention when read with the following description taken in conjunction with the accompanying drawings.

The figures are not drawn to scale and are illustrated for simplicity and clarity to help understand the various embodiments of the present invention. Throughout the drawings it should be noted that like reference numbers are used to depict the same or similar elements, features and structures.

DETAILED DESCRIPTION

The following descriptions with reference to the accompanying drawings are provided to assist in a comprehensive understanding of exemplary embodiments of the invention as defined by the claims and their equivalents. Accordingly, those of ordinary skill in the art will recognize that various changes and modifications of the embodiments described herein can be made without departing from the scope and spirit of the invention.

The present invention and its embodiments are mainly described in relation to 3GPP specifications and standards (LTE-Advanced) for applicability of certain exemplary embodiments. The terminology used is therefore related thereto. Such terminology is used in the context of describing the embodiments of the invention and it does not limit the invention in any way. Any other network architecture or system deployment, etc., may also be utilized as long as it is compliant with the features described herein.

Example embodiments to be described below are not intended to limit the present invention to any specific example, embodiment, environment, applications, or particular implementations described in these example embodiments. It should be appreciated that, in the following example embodiments and the attached drawings are illustrated for the ease of understanding, but not to limit the actual scale.

The following paragraphs will describe various embodiments of the invention. For exemplary purposes only, most of the embodiments are outlined according to the LTE-Advanced mobile communication system with the solution to the problem discussed in the background. It should be noted that the invention may be advantageously used in connection with the communication system described above, but the invention is not limited to its use in this particular exemplary communication network. The improvements/solutions proposed herein may be readily applied in architectures/systems having relevance to relay architectures. Some embodiments of the invention may also make use of standard and improved procedures of these architectures/systems.

The techniques described herein may be used for various wireless communication networks such as CDMA networks, CDMA implementing radio technology such as UTRA, TDMA networks, TDMA implementing radio technology such as GSM, FDMA networks, OFDMA networks, OFDDA implementing radio technology such as Evolved URTA (E-UTRA), SC-FDMA networks.

User equipment (UE) used in the following description denotes various terminologies used like an access terminal (AT), wireless communication device, terminal, wireless handset, computer or wireless module, wireless module for use with a computer, personal digital assistant (PDA), tablet computer or device.

In the overall architecture of a network with a relay node (RN), a relay node has a Base station (eNB) and a terminal side called as user equipment (UE). Towards UE the RN behaves as a conventional eNB using the access link (Uu interface) and the UE is not aware of whether it is communicating with a relay node or a Base station. Relay nodes are therefore transparent for the UE. Towards Base stations relay nodes initially operate as a UE using the radio interface to connect to the base station. Once connection is established and the relay node is configured, the relay uses a subset of the UE functionality for communication on the backhaul link (Un interface). The UEs are connected to the RN by means of an Uu interface and the RN to the Base station by means of Un interface.

When the network e.g., MME has no valid location or routing information for the UE, the UE cannot be reached. This is more likely when the UE is in a state of switched off, or out of coverage area. 3GPP defines this state as a de-registered state and this could also happen when the UE is in non-3GPP access. When the UE is attached to the network e.g., MME, it can receive Core Network services. This state is defined by 3GPP as registered state. In this registered state the UE can be in two different connection management states like RRC_IDLE state and RRC_CONNECTED state. When no data is being transmitted and the radio resources are released, the UE has a valid IP configuration. In such idle state there is no Non-Access Stratum (NAS) signaling connection between the UE and the network, e.g., MME. Also during the idle state there is no 51 connection between the eNB and the Serving Gateway. In the RRC_CONNECTED state, there is an active connection between the UE and Base station, which implies a communication context being stored within the Base station for this UE. Both sides can exchange user data and or signaling messages over logical channels.

From the wireless network perspective, protocol structure for the User and Control planes correspond to user data transmission and signaling transmission. Control plane corresponds to the information flows actually considered as signaling by E-UTRAN and Core Network. This includes all the RRC (Radio Resource Control) E-UTRAN signaling (supporting functions such as Radio Bearer management, radio mobility, user paging) and NAS (Non Access Stratum) signaling. On the radio interface, the Control plane uses the Control plane protocol stack namely PDCP (Packet Data Convergence Protocol), RLC (Radio Link Control), MAC (Medium Access Control) and PHY (Physical) stack to transport both RRC and Core Network NAS signaling. The above protocol stack layers support the same functions for both the User and Control Planes. When a Non-Access Stratum (NAS) signaling connection needs to be established between UE and the MME routed via relay node, the UE and the MME shall enter the connected state.

It should be noted that Base station is in fact connected to one or more than one MME or Serving GW node. These pluralities of Base station form a pool area such that a pool area can be served by one or several MME and/or Serving GW. A given MME or Serving GW node may serve one or several pool areas. The connectivity of the relay node and the UE communicating via relay node, is managed by the network e.g., MME. Based on initial NAS signaling, MMEs in the pool analyzes the request and determines which MME should manage the radio resources for the respective relay node or the UE communicating via relay node. This communication message essentially comprising of bearer request acknowledgement, indicates the uplink channel through which the UE is to communicate for establishing radio bearers. For the sake of simplicity MME managing the UE and the MME managing the RN is indicated as MME_UE and MME_RN respectively, hereinafter.

Figure 1:
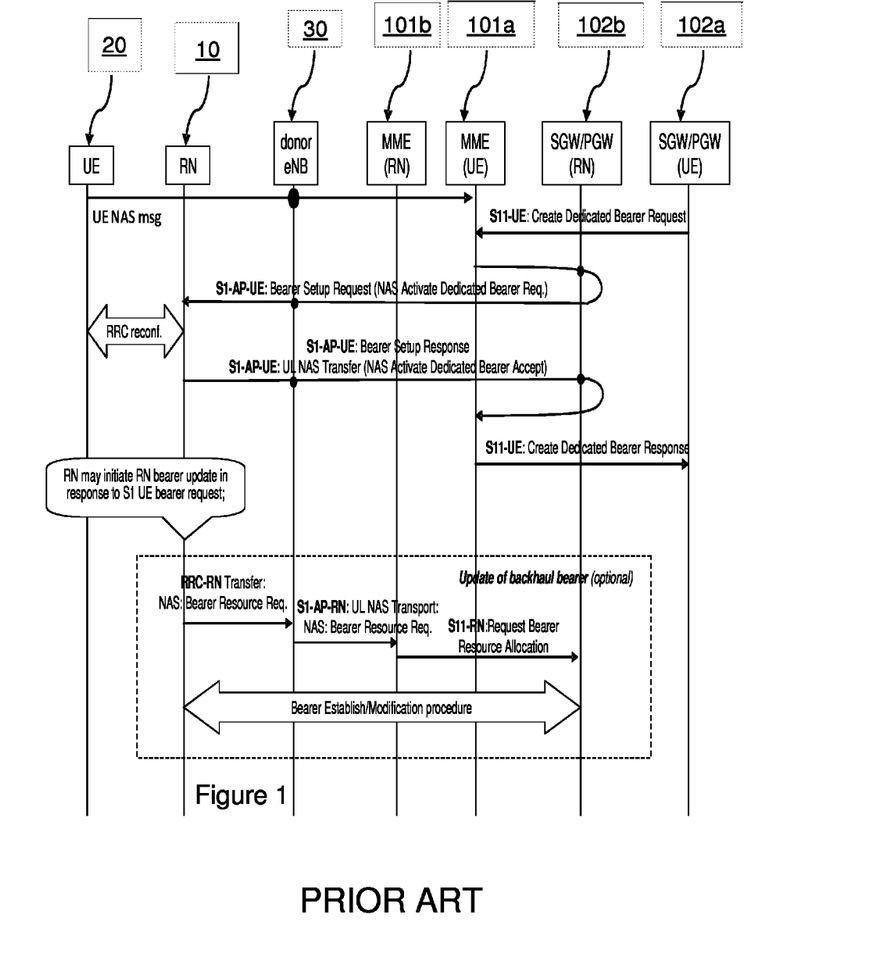
FIG. 1 is an illustration of existing bearer establishment procedure for user equipments (UE) and relay node (RN) as specified in 3GPP LTE (A) network architectures.

FIG. 1 shows the signaling message for bearer initiation procedure existing in 3GPP LTE specification. UE 20 sends an initial NAS message or service request to the MME_UE 101a, which is routed through RN 10 and Base station 30. When a NAS layer in the UE has to send an initial NAS message denoted as 'UE NAS Msg' in FIG. 1, the UE first initiates the establishment of the Radio Resource Control (RRC) connection over the Uu interface. The RRC procedures are elaborated in 3GPP specification TS 36.331 available at www.3gpp.org. In parallel to the establishment of the RRC connection over the Uu interface, the RN initiates the establishment of the RRC connection over the Un interface. The RRC connection establishment procedure over the Uu and Un interfaces are identical.

The NAS message is directed to MME (UE) 101a and the RN 10 is transparent. The MME_UE 101a understands the message and forwards it to the SGW/PGW_UE 102a for checking the UE subscription data. Then the SGW/PGW_UE 102a in conjunction with PCRF (not shown) authorizes MME_UE 101a to create a dedicated bearer and sends the message over S11 interface (Interface between S/PGW and MME). On receiving the response, MME_UE 101a sends bearer setup request to the UE 20 as an S1-AP message routed through RN 10. RN 10 understands this S1-AP message and initiates RRC configuration between UE 20 and RN 10. A bearer setup response is then sent by UE 20 to MME_UE 101a routed via RN 10 and Base station 30 as an S1-AP message. On receiving the response from UE 20, MME_UE 101a establishes the bearers and sends the response to SGW/PGW_UE 102a. This process establishes radio bearers to enable data flow from the SGW/PGW_UE 102a to the UE 20. After completion of this procedure, the RN 10 may send a NAS message seeking bearer-resource request to MME_RN 101b through Base station 30. MME_RN 101b understands the message and provisions bearer resource allocation to RN 10. Upon receiving bearer resource allocation, RN 10 bearer establishment is completed. Radio resources for the relay node 10 are allocated so as to serve the already established UE's bearer requirements. The above process of initiating bearer establishment can also be initiated by EPC/Core Network. This happens both when the UE 20 is in the RRC_IDLE state and a message/data is to be transported to the UE 20 by the Core Network or when there is a change in existing bearer configuration to the UE 20 in the RRC_CONNECTED state. In this state, MME_UE 101a initiates bearer-setup or modify procedure for the UE 20 at any point of time based on UE subscription and QoS requirements. Thus in all the above instances of UE NAS Messages, whenever a UE 20 bearer is created or modified, the RN bearer, modify or create may be initiated subsequently by the RN 10. Thus additional messages are exchanged separately for the UE 20 and for the RN 10 to modify/create a new bearer. This either wastes or underutilizes the backhaul bandwidth. Further, there is delay in traffic flow.

Figure 2:
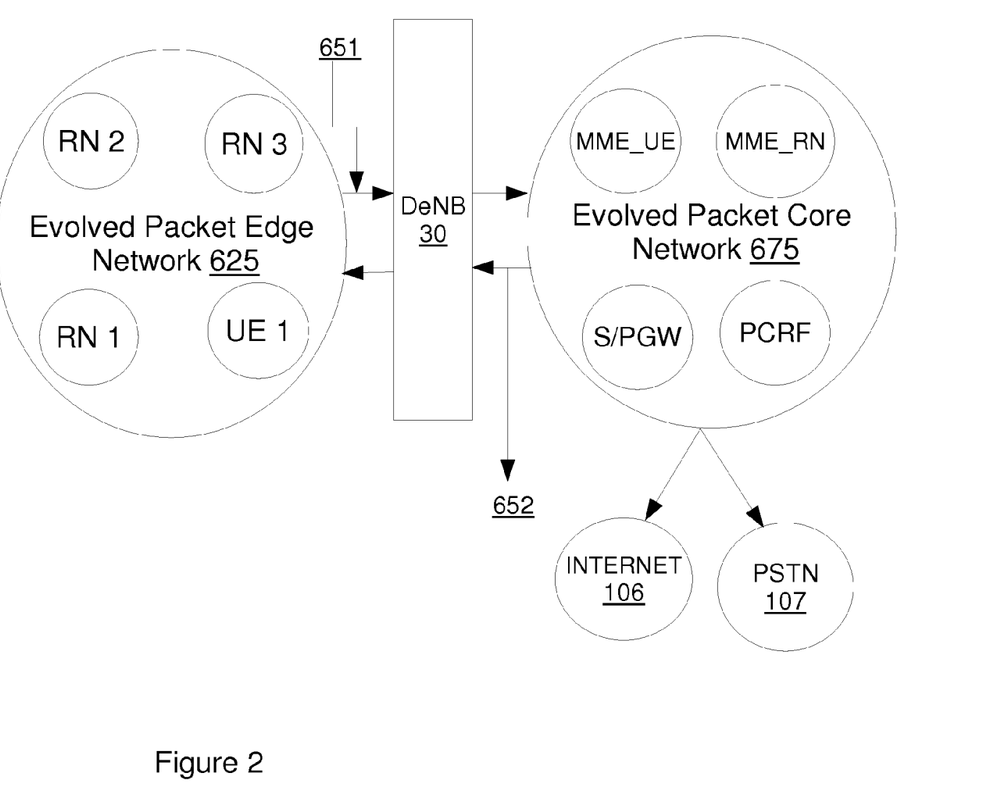
FIG. 2 shows the network nodes conglomeration between two network entities in accordance with the principles of the invention.

FIG. 2 shows the network nodes conglomeration between two network entities in accordance with the principles of the invention. Network entity 625 is called as Evolved Packet Edge (EPE) comprising of plurality of network nodes like UE, RN and all other nodes that communicate with Evolved Packet Core Network entity 675 via Base station 30. Network nodes in the EPE 625 may establish connectivity external to EPC like Internet 106 or PSTN (Public Switch Telephone Network) 107. EPC entity 675 comprises of network nodes like Mobility Management Entity (MME), Serving gate way/Packet gate way (S/PGW), Policy of Charging Rules Function, PCRF etc., These nodes essentially manages the entities in the EPE. For e.g., a UE bearer resource request is processed and allowed only by the MME serving the UE. Depending on the complexity of the communication network, it so happens that, MMEs are segregated to perform management of plurality of UE and RN separately. In such cases, it is appropriate to indicate MMEs serving the UEs as MME_UE and MMEs serving the RNs as MME_RN.

As part of bearer management signaling as envisaged, a communication from EPE 625 comprising of bearer resource request of both the UE and RN is transported via Base station 30 to EPC as a single signaling message over uplink channel 651 hereinafter referred to as "Union of Resource Request" (UR Request) message. The response message comprising of bearer resource response from either one of the managing entity or managing entities of EPC 675 are transported as a single signaling message to Base station 30 over the downlink channel 652 hereinafter referred to as "Intersection of Admission Response" (IA Response). This manages bearer setup signaling loop, with a single transportation of 'UR Request' signaling message and receiving one "IA Response" signaling message over uplink and downlink channels respectively.

Figure 3:
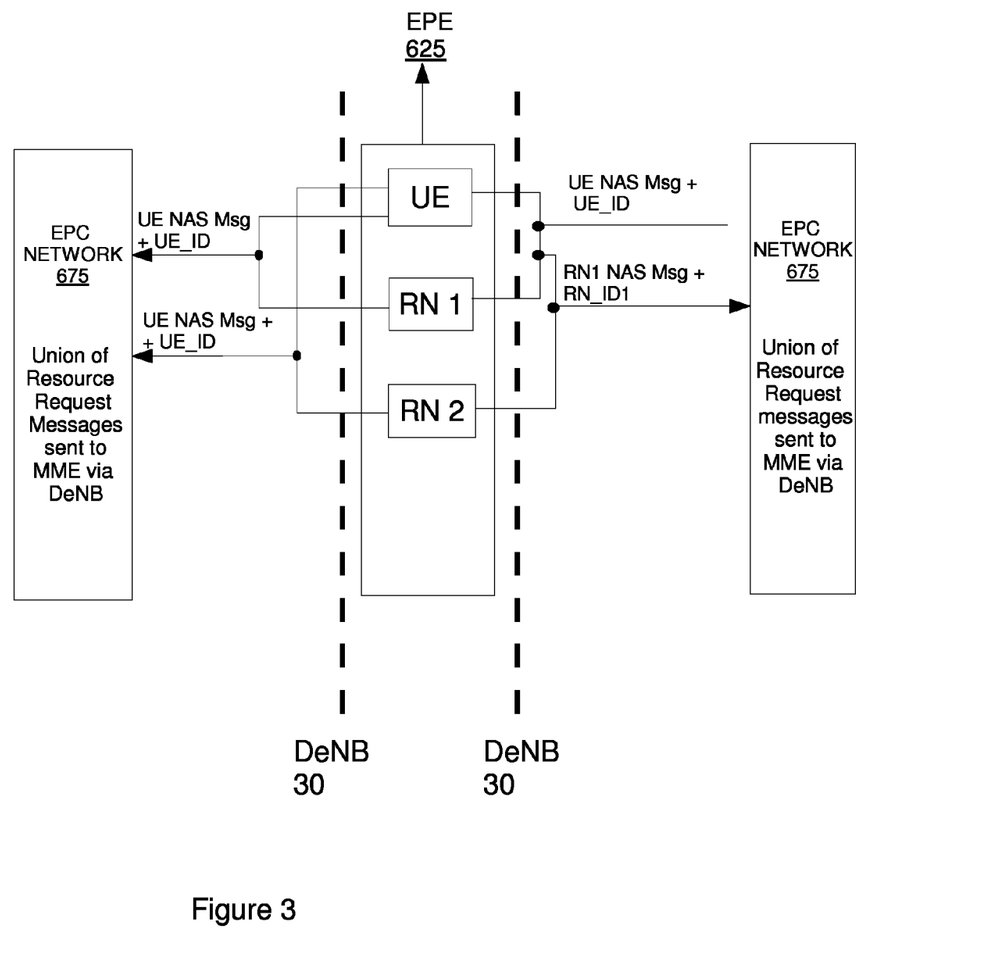
FIG. 3 represents 'UR Request' message signaling in the uplink from Evolved Packet Edge to Evolved Packet Core via Base station in accordance with the embodiments of the invention.

FIG. 3 represents "UR Request" message signaling in the uplink from EPE 625 to EPC 675 via Base station 30 in accordance with the embodiments of the invention. When the UE 20 is in the state of RRC_CONNECTED or RRC_IDLE; a UE NAS signaling message requesting bearer resource of the form 'Create, Update, Detach, Modify' etc., hereinafter referred to as "CRUD" messages, are generated. It so happens that, depending on the complexity of the EPE communication network, multiple relay nodes may be wirelessly connected in a sequence so as to serve a distant UE. In such cases, a bearer request of a UE initiated by sending a UE NAS message to the MME in the EPC 675 has to be routed via all the relay nodes acting in sequence. Such an arrangement is shown towards the right of EPE 625.

The UE NAS message generated by UE 20 is received at the first upstream relay node (RN1). The first relay node encapsulates the said received UE NAS message in the RN1 NAS message by adding the identity of UE (UE_ID). The RN1 NAS message thus created by first relay node is received by the second upstream relay node RN2, which encapsulates the said received RN NAS message in its RN2 NAS message by adding the identity of the downstream relay node (RN1_ID) as this RN is the UE for the upstream relay node. Relay node identity or RN_ID is a unique identifier that uniquely identifies the MME serving the said RN. Relay node identity comprises of MME Group ID, MME code of MME_RN. The encapsulated RN2 NAS message is referred to as tagged message (UE_TAG) and represented as "UR Request". Similar tagging is done for any number of such upstream relay nodes. The above said tagged message is forwarded to the managing entity of RN within EPC 675 via Base station 30. The tagged message is available at the MME_RN within EPC as "UR Request" message.

In case of a single relay node, encapsulated 'RN NAS message with UE_ID' forms the tagged message. Depending on the mobility of the UE within EPE of a communication network, it so happens that, a single UE may be connected to different relay nodes. Such circumstances may arise based on the mobility of the UE and/or proximity of the UE with a RN exhibiting excellent signal strength. In such cases, a bearer request of a UE initiated by sending a UE NAS message to the MME in the EPC 675 has to be routed through the respective RN which is coupled to the UE. Such an arrangement is shown towards the left of EPE 625.

Figure 4:
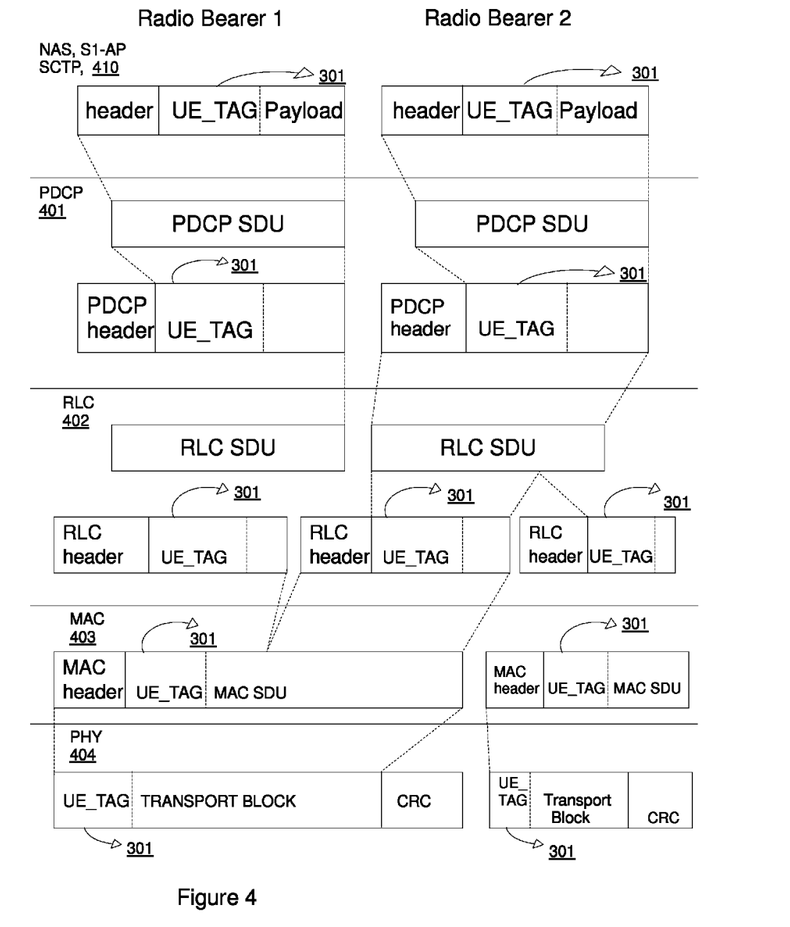
FIG. 4 shows a detailed method of tagging (UE_TAG) in any one of the control plane protocol layers in accordance with the embodiments of the invention.

FIG. 4 depicts protocol layers through which insertion of UE_TAG (comprising of UE_ID and type prefix for the said UE_ID) by the RN 10 preferably at NAS layer or any one of the control plane protocol layers of S1-AP, SCTP, PDCP, RLC, MAC, PHY, is accomplished in accordance with the embodiments of the invention. For the sake of illustration the flow of uplink signaling data in case of two radio bearers is shown with possible UE_TAG insertion points, at any one of the protocol layers. For the sake of brevity, the control plane protocol layer 410 above PDCP layer 401 is shown as an integrated layer comprising of NAS, S1-AP, and SCTP (Stream Control Transmission Protocol).

The PDCP layer 401 performs IP-header compression and ciphering. A PDCP header is added, carrying information required for deciphering in the UE. The output from the PDCP is forwarded to the RLC layer 402. The RLC protocol performs concatenation and/or segmentation of the PDCP Service Data Units (SDUs) and adds an RLC header. The RLC Service Data Units (PDUs) are forwarded to the MAC layer 403, which multiplexes a number of RLC SDUs and attaches a MAC header to form a transport block. Finally the Physical layer 404 attaches a CRC (Cyclic Redundancy Check) to the transport block for error-detection purposes and transmits the resulting signal using transmit antennas. In the above protocol structure, possible insertion of UE_TAG 301 (shown by arrow headers) could be at any one of the layers. For e.g., UE_TAG 301 can be preferably inserted at header junction of layer 410, or at PDCP header junction of layer 401, or at RLC header junction of layer 402 or at MAC header junction of layer 403 or at any junction of the PHY layer 404. Similarly for each radio bearer signaling flow a possible UE_TAG 301 could be inserted at any one of the protocol layers as explained above.

Figure 5:
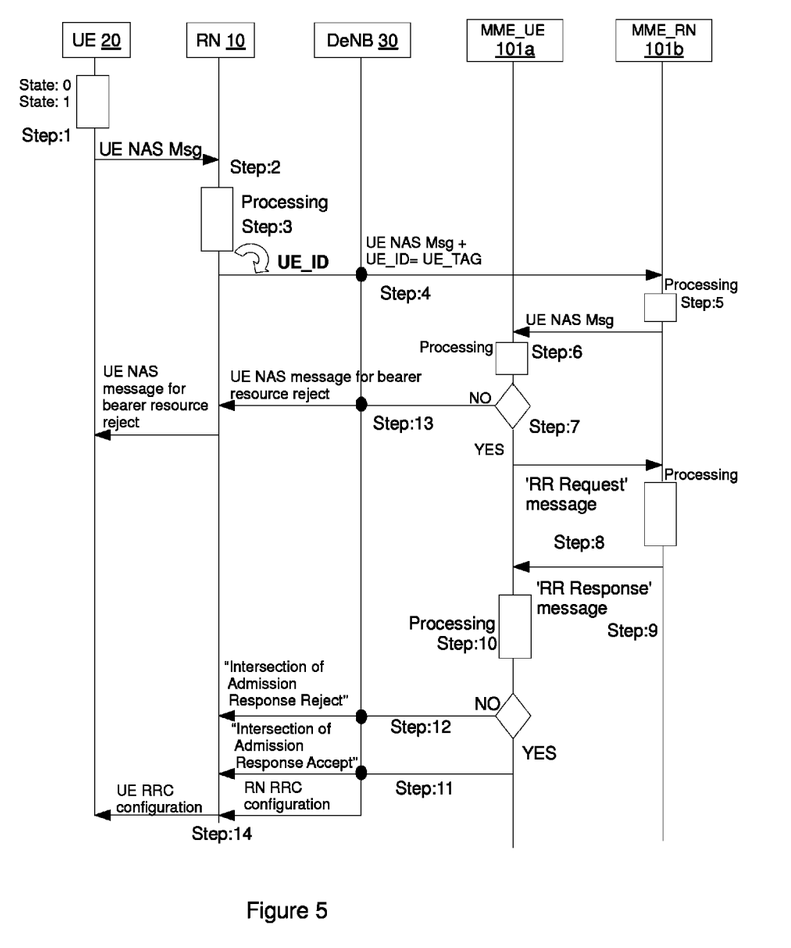
FIG. 5 represents bearer establishment signaling loop in accordance with various aspects of the invention.

FIG. 5 represents bearer setup signaling loop, with a single transportation of "UR Request" signaling message by EPE entities and receiving one "Intersection of Admission Response" (IA Response) signaling message by Base station over uplink and downlink channels respectively, in accordance with the embodiments of the present invention. For the sake of simplicity, UE coupled with one RN is shown. When the UE 20 is in the state of RRC_CONNECTED (1) or RRC_IDLE (0), (Step 1) CRUD messages are generated by UE or initiated by EPC. In either case, UE 20 generates either single or multiple bearer resource requests within a single NAS message thereby triggering the establishment of RRC connection with the RN 10 in case UE is in RRC_IDLE (0) mode. RN 10 also starts the establishment of the RRC connection with the Base station 30 in case RN is in RRC_IDLE (0) state. Both these RRC procedures over the respective Uu and Un interface are elaborated in 3GPP specification TS 36.331.

When the RN 10 receives the UE NAS Message (Step 2), relay node encapsulates the said received UE NAS message in the RN NAS message by adding the identity of UE (UE_ID) (Step 3) to be sent to the MME_RN 101*b* via Base station 30. Without loss of generality the denotation 'UE NAS Msg+UE_ID' will be called as 'UE_TAG' which means that it is a tagged message essentially consisting of UE NAS Message with UE_ID (Step 4). The above denotation is specifically defined for the purpose of this invention as a tagged message denoted as UE_TAG. In the case of multiple relay nodes upstream (For e.g., RN1 and RN2), the first upstream relay node, RN1, encapsulates the said received UE NAS message in the RN1 NAS message by adding the identity of UE (UE_ID) at any one of the control plane protocol layers S1-AP, SCTP, PDCP, RLC, MAC, PHY preferably over NAS. The RN1 NAS message thus created by first relay node is received by the second upstream relay node, RN2, which encapsulates the said received RN1 NAS message in its RN2 NAS message by adding the identity of the downstream relay node (RN1_ID) as this RN is the UE for the upstream relay node. The encapsulated RN2 NAS message is referred to as tagged message (UE_TAG) and represented as "UR Request". Similar tagging is done for any number of such upstream relay nodes The UE_TAG is then transmitted from the RN 10 to the MME_RN 101*b* via Base station 30 over Un interface as a control plane signaling message. When this UE_TAG arrives at Base station 30, Base station 30 understands the message to be a 'UE_TAG' message except when tagged as NAS layer, and then forwards it to MME_RN 101*b*; the MME_RN 101*b*, understands the message and if the tagged message is not a "UR Request" message it treats as 'other control plane signaling message'. If the tagged message is a CRUD message then the MME_RN 101*b* de-capsulates UE 20 NAS message and forwards the request to MME_UE 101*a* using the identity of UE. In case of multiple relay nodes, the RN2 NAS message received by the Base station from the downstream relay node is forwarded to the mobility management entity serving the said downstream relay node (MME_RN2). The said MME_RN2 understands the received RN2 NAS message and de-capsulates the message and forwards the RN1 NAS message if found, within the said received RN2 NAS message to the mobility management entity serving the said relay node (MME_RN1) based on the identity of relay node. MME_RN1 understands the received RN1 NAS message and de-capsulates the 'UE NAS message' and forwards the 'UE NAS message' along with the identity of MME_RN2 and any other MME_RN identities which are in the sequence of receiving the RN NAS message to MME_UE based on the UE identity inside RN1 NAS message (Step 5). The thumb rule for providing the identities of MME_RN to next node is that, identities of all MME_RNs via which the message has traversed except the identity of the node which is forwarding the message shall be provided to the next MME node.

When the UE NAS message is received and understood by the MME_UE 101*a* to be a bearer resource request message (Step 6), it grants utmost UE request and generates relay node resource request (RR request) messages for granted resources by MME_UE. Thereafter a relay node resource request (RR Request) message is generated, to be sent to MME_RN 101*b* (Step 8). (In case of multiple relay nodes in sequence, MME_UE 101*a* generates relay node resource request (RR request) messages for granted resources by MME_UE, for MME_RNs identified by MME_RN identities). If the MME_UE 101*a* does not grant UE 20 bearer request at step 7, then MME_UE 101*a* generates 'UE NAS message for bearer resource reject' and forwards it for UE 20 via Base station 30 (Step 13).

The 'RR Request' message generated by the MME_UE 101*a* for MME_RN 101*b* is a bearer request on behalf of RN 10. The message essentially is an establishment of RN bearer to serve UE bearer QoS requirements. (For e.g., the 'RR Request' message may be that, some bandwidth is guaranteed for the UE 20 which is being served by the RN 10 (RN_ID). Hence MME_RN 101*b* is required to process RN 10 bearer request). The 'RR Request' is then forwarded to MME_RN 101*b*. Once RN 10 bearer request is granted, MME_RN 101b generates 'RR Response' message (Step 8). In case of multiple relay nodes, MME_UE forwards the granted resources of UE and forwards 'RR Request' messages to MME_RNs based on the identities of RNs. The MME_RNs grants utmost 'RR Request' and generates 'RR Response' message for the said received 'RR Request' messages and forwards the generated 'RR Response' message to the MME_UE. 'RR Response' message includes at least one among 'RR Response Positive Ack', 'RR Response Negative Ack'.

If MME_RN 101b grants at least partial 'RR Request', it generates 'RR Response Positive Ack' and then forwards it to MME_UE 101a. If the MME_RN 101b does not grant 'RR Request' made by MME_UE 101a, then MME_RN 101b generates 'RR Response Negative Ack', and then forwards it to MME_UE 101a. MME_UE 101a receives the 'RR Response' from the MME_RN 101b (Step 9) and processes it. 'RR Response' message received from MME_RN 101b is interpreted by MME_UE 101a (Step 10). If the message received is 'RR Response Positive Ack', then MME_UE generates and forwards to Base station "IA Response Accept" message (Step 11). If the message received from MME_RN 101b is an 'RR Response-Negative Ack', then MME_UE generates and forwards to Base station "IA Response Reject" message (Step 12). Once "IA Response Accept" message is received by Base station, if required it performs RRC configuration for the downstream RN, which in turn performs RRC configuration for the remaining EPE entities (Step 14) if required. RRC procedures are similar to the procedures as elaborated in 3GPP specification TS 36.331. Intersection of Admission Responses forwarded by MME_UE 101a to Base station may be multiplexed, encapsulated or concatenated.

"Intersection of Admission Response" that is available to Base station, comprises of bearer resource allocation message pertaining to the respective EPE entities. For e.g., if MME_UE grants bearer resource (x) to the UE (Y), MME_UE generates 'RR Request' message seeking bearer allocation for the relay nodes (P,Q,R) and forwards to the respective MME_RNs. The 'RR Request' message may be in the form of Yx(P,Q,R). MME_RNs may grant the same resources ('x') to the respective relay nodes (P,Q,R). In such cases "RR Response" messages generated by MME_RNs may be x(P,Q,R). When this 'RR Response' message is received by MME_ UE. MME_UE may generate an "Intersection of Admission Response" in the form of (Y, P, Q, R)(x,x,x,x). This response is understood by the Base station as a message comprising of allocated bearer resources corresponding to the value of 'x' to UE, and as a message comprising of allocated bearer resources corresponding to the value of 'x' for the relay nodes 'P', 'Q' and 'R' respectively. In the above given example, in case MME_RNs grants bearer resources for each relay node in the sequence P,Q,R, corresponding to the value less than the granted value of UE i.e., 'x–a', then the 'RR Response' message that is generated by MME_RNs would be '(P,Q,R)(b,b,b)', (wherein x–a=b). When this 'RR Response' message is received by MME_ UE, MME_UE may generate an "Intersection of Admission Response" in the form of '(Y, P,Q,R)(b,b,b,b)'. This "Intersection of Admission Response" is understood by the Base station as a message comprising of allocated bearer resources corresponding to the value of 'b' to UE, and as a message comprising of allocated bearer resources corresponding to the value of 'b' for the respective relay nodes 'P', 'Q' and 'R'. Further in the given example above, in case MME_RN managing 'P' grants bearer resources for the relay node 'P' corresponding to the value less than the granted value of UE i.e., 'x–d'; and MME_RN managing 'Q' grants bearer resources for the relay node 'Q' corresponding to the value less than the granted value of RN 'P' i.e., 'x-e'; and MME_RN managing 'R' grants bearer resources for the relay node 'R' corresponding to the value less than the granted value of RN 'Q' i.e., 'x–f' wherein (f<e<d), then the 'RR Response' messages that are generated by the respective MME_RNs would be '(P,Q,R)(d,e,f)'. When this 'RR Response' message is received by MME_UE, MME_UE may generate an "Intersection of Admission Response" in the form of '(Yx,P,Q,R)(d,d,e,f)'. This "Intersection of Admission Response" is understood by the Base station as a message comprising of allocated bearer resources corresponding to the value of 'd' to UE, and as a message comprising of allocated bearer resources corresponding to the value of 'd', 'e', and T for each of the relay nodes 'P', 'Q' and 'R' respectively. As illustrated here, Intersection of Admission Response is the intersection of MME_UE grant with that of the MME_RN grant for the UE.

Once MME_UE generates "IA Response Accept" message, it forwards to Base station "IA Response Accept" message as received by the Base station comprises of 'S1-AP message for UE', and 'S1-AP message for RNs'. Base station performs RRC configuration for the said downstream RN and then forwards "IA Response Accept" message to the said RN. "IA Response Accept" message received by the said RN is different from the "IA Response Accept" message received at the Base station. The "IA Response Accept" message received at the said RN is "IA Response Accept" message received at the Base station without 'bearer configuration' for the said RN. This is so because the S1-AP bearer configuration message for the said RN has been already used by the Base station. "IA Response Reject" message as received by the Base station comprises of S1-AP message for UE, and 'RN NAS message for bearer resource reject'. Base station forwards "IA Response Reject" message to RN. RN may use the S1-AP message for UE to do RRC configuration.

In case of multiple relay nodes the 'RR Request' is received and understood by the MME_RNs. MME_RNs have complete knowledge of bandwidth usage of all the relay nodes (for eg., relay nodes RN1, RN2). Then, based on the bandwidth requirement, bandwidth usage of the relay nodes and maximum bandwidth limit for the relay nodes, MME_RN2 processes and grants the bearer request for the relay node RN2 and MME_RN1 grants the bearer request for the relay node RN1. In such cases MME_RN2 and MME_RN1 generates 'RR Response Positive Ack' message and forwards it to MME_UE. MME_UE generates "IA Response Accept" message and forwards it to Base station "IA Response Accept" message as received by Base station comprises of: 'S1-AP message for UE' and 'S1-AP message for RN1 and RN2'. Base station performs RRC configuration for the said downstream RN2 and then forwards "IA Response Accept" message to the said RN2. "IA Response Accept" message received by the said downstream RN2 is different from the "IA Response Accept" message received at the Base station. The "IA Response Accept" message received by the downstream RN2 is "IA Response Accept" message received at the Base station without 'bearer configuration' for the said downstream RN2. This is so because the S1-AP bearer configuration message for the said downstream RN2 has been already used by the Base station Similarly, the said downstream RN2 performs RRC configuration for its downstream RN1 and forwards "IA Response Accept" message to it. The "IA Response Accept"

message received by the downstream RN1 is "IA Response Accept" received by the RN2 without 'bearer configuration' for the said downstream RN1. This is so because the S1-AP bearer configuration message for the said downstream RN1 has been already used by the RN2. Thereafter RN1 being the first upstream node for the said UE performs RRC configuration for the 'S1-AP message for UE' and forwards bearer configuration message to UE.

The MME_RNs may not grant bearer resources for any of the relay nodes (for e.g., RN1, RN2). In such cases MME_RNs generates 'RR Response Negative Ack' messages and forwards to MME_UE. MME_UE generates "IA Response Reject" message and forwards it to Base station "IA Response Reject" message as received by Base station comprises of: 'S1-AP message for UE' and 'RN NAS message for bearer resource reject' for all the RNs' (e.g., RN1 and RN2). Base station forwards the received "IA Response Reject" to the said downstream RN2.

The MME_RN2 may grant the bearer resources for RN2 and for some (eg., RN1), bearer resource is not granted. In such cases "IA Response Reject" message generated by MME_UE comprises of: 'S1-AP message for UE', 'S1-AP message for RN2' for which the resources are granted, and 'RN NAS message for bearer resource reject' for which bearer resources are not granted. The S1-AP message for RN2 may be used by the Base station for RRC reconfiguration of the said RN2, and forward "IA Response Reject" to RN2. The "IA Response Reject" message received by RN2 is "IA Response Reject" received by the Base station without 'bearer configuration' for the said downstream RN2. This is so because the S1-AP bearer configuration message for the said downstream RN2 has been already used by the Base station for RRC reconfiguration of the said RN2. The "IA Response Reject" message received by RN1 further contains 'RN NAS message for bearer resource reject' for RN1.

Another embodiment of the invention relates to the implementation of the above described various embodiments using hardware and software. It is recognized that the various embodiments of the invention may be implemented or performed using computing devices (processors). A computing device or processor may for e.g., be general purpose processors, digital signal processors (DSP), application specific integrated circuits (ASIC), field programmable gate arrays (FPGA) or other programmable logic devices, etc. The various embodiments of the invention may also be performed or embodied by a combination of these devices Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

The present invention also covers any conceivable combination of method steps and operations described above, and any conceivable combination of nodes, apparatuses, modules or elements described above, as long as the above-described concepts of methodology and structural arrangement are applicable. It should be further noted that the individual features of the different embodiments of the invention may individually or in arbitrary combination be subject matter to another invention.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

We claim:

1. A method for bearer management signaling in a communication network, the method comprising:
   forming union of request (UR) message in the evolved packet edge (EPE),
   transporting the UR request message from the EPE via a base station to a managing entity of relay nodes (RNs) within an evolved packet core (EPC), wherein the management entity of RNs are network nodes that manage or administer RNs, wherein the management entity of RNs comprises at least one of the following: a mobility management entity serving the relay node (MME_RN), a serving gate way node, packet gate way node, and a policy of charging rules function (PCRF); and
   receiving an intersection of admission (IA) response by the base station for the transported UR request from the management entity, wherein the management entity is the mobility management entity configured to serve or manage entities in the EPE.

2. The method of claim 1, wherein, forming UR request comprises:
   tagging a non-access stratum (NAS) message received by the relay node, wherein tagging the NAS message comprises adding a user equipment identity (UE_ID) with the NAS message;
   constructing a relay node NAS (RN NAS) message by encapsulating the received NAS message along with a tag, wherein the NAS message is a user equipment NAS (UE NAS) message when coupled to the UE, wherein the NAS message is the relay node NAS (RN NAS) message when coupled to the UE via at another relay node, and wherein the UE_ID is a relay node identity (RN_ID) when coupled to the UE via the another relay node; and
   forwarding the RN NAS message to he MME_RNs via the base station.

3. The method of claim 1, wherein forming the UR message in the EPE comprises forming the UR message comprising a bearer resource request of both the UE and the RN.

4. The method of claim 1, wherein transporting the UR request comprises:
   receiving at a first relay node of the EPE, the UR request from the UE;
   encapsulating, by the first relay node the UE_ID of the UE in the UR request; and
   forwarding the UR request to the MME_RN in the EPE.

5. The method of claim 4, further comprising:
   receiving by the MME_RN the UR request;
   determining, by the MME_RN, a MME associated with the UE (MME) based on the UE_ID encapsulated in the UR request; and
   forwarding, by the MME_RN, the UR request to the MME_UE.

6. The method of claim 5, further comprising:
   receiving, by the MME-UE. the UR request from the MME_RN;
   granting an utmost UE request;
   generating a relay node resource (RR) request; and
   sending the RR request to the MME_RN.

7. The method of claim 6, wherein generating the RR request comprises establishing a RN bearer to serve UE bearer quality of service (QoS) requirements.

8. The method of claim 6, further comprising:
receiving, by the MME_RN, the RR request;
granting, by the MME_RN the RR request;
generating, by the MME_RN, in response to the granting, a response to the RR request, the generated response comprising RR response; and
forwarding, by the MME_RN, the RR response to the MME_UE.

9. The method of claim 6, wherein generating the RR response comprises generating at least one of the following: a RR response positive acknowledgement and a RR response negative acknowledgement.

10. The method of claim 8, further comprising:
receiving by the MME_UE the RR response from the MME_RN;
creating, by the MME_UE, the IA response based on the received RR response; and
forwarding, by the MME_UE, the generated IA response to the base station.

11. The method of claim 10, wherein creating the IA response comprises:
determining whether the RR response comprises a RR response positive acknowledgement; and
creating, in response to determining that the RR response comprises the a RR response positive acknowledgement, the IA response.

12. The method of claim 1. wherein forming the UR message comprises forming the UR message by the UE when the UE is in idle connected state with the EPE.

13. A method for bearer management signaling in a communication network, the method comprising:
forming an union of resource (UR) request message in an evolved packet edge (EPE), wherein the EPE comprises a user equipment (UE) and a relay node (RN);
transporting the UR request message from the EPE via a base station to a managing entity of relay nodes (RNs) within an evolved packet core (EPC), wherein the managing entity of RNs are network nodes that manage or administer RNs, wherein the management entity of RNs comprises at least one of the following: a mobility management entity serving the relay node (MME_RN), a serving gate way node, and a packet gate way node; and
receiving an intersection of admission response by the base station for the transported UR Request, from the management entity of the UE within the EPC, wherein the management entity is the mobility management entity not serving/managing same entities in the EPE.

14. The method of claim 13, wherein, forming the UR request comprises:
tagging a non-access stratum (NAS) message received by the relay node, wherein tagging the NAS message comprises adding a user equipment identity (UE_ID) with the NAS message;
constructing a relay node NAS (RN NAS) message by encapsulating the NAS message along with a tag, wherein the NAS message is a user equipment NAS (UE NAS) message when coupled to the UE, wherein the NAS message is the relay node NAS (RN NAS) message when coupled to the UE via an another relay node, and wherein the UE_ID is a relay node identity (RN_ID) when coupled to the UE via the another relay node; and
forwarding the RN NAS message to the MME_RNs via the base station.

15. A bearer management signaling system for relay node in a communication network comprising:
a receiver for receiving a non-access stratum (NAS) and an intersection of admission (IA) response message;
a processor configured for tagging the NAS message, wherein tagging the NAS message comprises adding a user equipment identity ($UE_{13}$ ID) with the received NAS message, wherein the NAS message is a relay node NAS (RN NAS) message when coupled to a user equipment (UE) via an another relay node, and wherein the $UE_{13}$ ID is a relay node identity ($RN_{13}$ ID) when coupled to the UE via the another relay node;
wherein the processor is further configured for constructing the RN NAS message by encapsulating the NAS message along with a tag;
a transmitter for transmitting the RN NAS message towards a managing entity via a base station;
wherein the processor is further configured for understanding the received IA response message and the NAS message from the base station and performing a radio resource control (RRC) configuration if indicated in the IA response message;
wherein the transmitter if further configured for transmitting the NAS message, a radio bearer configuration message and the IA response message to EPE entities; and
a memory that retains instructions for executing functions associated with the receiver, the processor, and the transmitter.

* * * * *